US008032858B2

(12) United States Patent
Barcia et al.

(10) Patent No.: US 8,032,858 B2
(45) Date of Patent: Oct. 4, 2011

(54) METHOD AND SYSTEM FOR NAVIGATIONALLY DISPLAYING HTTP SESSION ENTRY AND EXIT POINTS

(75) Inventors: Roland Barcia, Leonia, NJ (US); Kulvir Singh Bhogal, Fort Worth, TX (US); Robert Ross Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 11/846,505

(22) Filed: Aug. 28, 2007

(65) Prior Publication Data

US 2009/0064102 A1 Mar. 5, 2009

(51) Int. Cl.
*G06F 9/44* (2006.01)
*G06F 9/45* (2006.01)

(52) U.S. Cl. .................. 717/100; 717/108; 707/802

(58) Field of Classification Search .......... 717/100–105, 717/114–116, 108–109; 707/776, 802
See application file for complete search history.

(56) References Cited

U.S. PATENT DOCUMENTS

| | | | | |
|---|---|---|---|---|
| 5,572,731 | A * | 11/1996 | Morel et al. | 717/104 |
| 5,586,326 | A * | 12/1996 | Ryu et al. | 717/104 |
| 5,721,926 | A * | 2/1998 | Tamura | 717/104 |
| 6,158,044 | A * | 12/2000 | Tibbetts | 717/100 |
| 6,381,743 | B1 * | 4/2002 | Mutschler, III | 717/104 |
| 6,427,228 | B1 * | 7/2002 | Wigger | 717/111 |
| 6,789,251 | B1 * | 9/2004 | Johnson | 717/100 |
| 6,847,975 | B2 | 1/2005 | Nishikado et al. | 707/101 |
| 6,944,606 | B2 * | 9/2005 | Schmit et al. | 706/60 |
| 7,047,518 | B2 * | 5/2006 | Little et al. | 717/108 |
| 7,051,316 | B2 * | 5/2006 | Charisius et al. | 717/103 |
| 7,099,809 | B2 * | 8/2006 | Dori | 703/6 |
| 7,149,734 | B2 * | 12/2006 | Carlson et al. | 1/1 |
| 7,207,041 | B2 | 4/2007 | Elson et al. | 718/104 |
| 7,272,815 | B1 * | 9/2007 | Eldridge et al. | 717/101 |
| 7,451,403 | B1 * | 11/2008 | Srinivasan et al. | 715/763 |
| 7,493,594 | B2 * | 2/2009 | Shenfield et al. | 717/107 |
| 7,526,750 | B2 * | 4/2009 | Andrews et al. | 717/104 |
| 7,571,426 | B2 * | 8/2009 | Carroll, Jr. | 717/109 |
| 7,840,936 | B2 * | 11/2010 | Seeger et al. | 717/105 |
| 7,882,146 | B2 * | 2/2011 | Tomic et al. | 707/803 |
| 7,885,918 | B2 * | 2/2011 | Statchuk | 707/603 |
| 7,890,540 | B2 * | 2/2011 | Shaburov | 707/802 |
| 7,895,241 | B2 * | 2/2011 | Schoen et al. | 707/802 |
| 2002/0143958 | A1 | 10/2002 | Montero et al. | 709/228 |

(Continued)

OTHER PUBLICATIONS

Ohnishi et al, "P2P file sharing networks allowing participants to freely assign structured meta data to files", ACM pp. 1-8, 2007.*

(Continued)

*Primary Examiner* — Anil Khatri
(74) *Attorney, Agent, or Firm* — Cuenot, Forsythe & Kim, LLC

(57) ABSTRACT

A monitoring tool continuously monitors for insertion, call or deletion of objects from a session. Display of this information shows any get object, set object or remove object operations in the session and shows the entry and exit points for each such object, thus assisting the user whenever objects inserted or called remain in the session and are not removed, thus allowing the user to prevent any data buildup in the session. The display is performed in a navigational view or "state diagram" form of view which is constructed by polling the filesystem content and building a navigational view of the overall states and interactions occurring within the session.

5 Claims, 5 Drawing Sheets

U.S. PATENT DOCUMENTS

| | | | |
|---|---|---|---|
| 2002/0169860 A1 | 11/2002 | Duggan et al. | 709/223 |
| 2003/0110266 A1 | 6/2003 | Rollins et al. | 709/227 |
| 2006/0089990 A1 | 4/2006 | Ng et al. | 709/227 |
| 2006/0123121 A1 | 6/2006 | Maegawa et al. | 709/227 |
| 2006/0155756 A1 | 7/2006 | Stanev et al. | 707/103 R |
| 2006/0288106 A1 | 12/2006 | Kumar et al. | 709/227 |
| 2007/0011191 A1 | 1/2007 | Otokawa et al. | 707/102 |
| 2007/0027896 A1 | 2/2007 | Newport et al. | 707/102 |

OTHER PUBLICATIONS

Macdonald et al, "Deferring design pattern decisions and automating structural pattern chnages using a design pattern based programming system", ACM Trans. on Prog. Lang. and Sys., vol. 31, No. 3, article 9, pp. 1-49, 2009.*

Haslhofer et al, "A survey of techniques for archieving metadata interoperability", ACM Computing Surveys, vol. 42, No. 2, article 7, pp. 1-37, 2010.*

Reusch, "Matadata a key to data acquistion and information retrieval", IEEE, pp. 220-223, 2001.*

Thomas, Tony G.; "Using JMX to Manage Web Applications", Mar. 2003, from The ServerSide.com: http://www.theserverside.com/resources/article.jsp?l=JMXWebApps.

Brown, Kyle; "Session A21; WebSphere Best Practice Patterns: EJB's", New IBM e-business Applications Development Conference, Nov. 26-29, 2001, Barcelona, Spain.

* cited by examiner

FIG. 2

METHOD AND SYSTEM FOR NAVIGATIONALLY DISPLAYING HTTP SESSION ENTRY AND EXIT POINTS

CROSS-REFERENCE TO RELATED APPLICATION

The present invention is related to commonly-assigned U.S. patent application Ser. No. 11/846,500, entitled "METHOD AND SYSTEM FOR DISPLAYING HTTP SESSION ENTRY AND EXIT POINTS" and filed concurrently herewith.

FIELD OF THE INVENTION

This invention relates generally to enterprise development environments where source code for enterprise applications is developed using an automated coding tools such as the Eclipse Foundation's Eclipse® product or other generally available similar systems. More particularly, it relates to a device, method and system for providing a user who is developing source code for an enterprise application using such an automated coding tool with pertinent feedback that informs the user that session entry points have been created which have not yet been removed at the time the coding work is finished.

BACKGROUND OF THE INVENTION

Many Interactive Development Environment (IDE) tools exist today to assist users in creating business enterprise computer applications and/or web pages or web applications for conducting business with on-line customers of the enterprise. A few examples are the aforementioned Eclipse® Integrated Development Environment and the Microsoft Corporation's Visual Studio® product. In practice, nearly all enterprise web applications are built using a set of libraries in a composing framework such as Apache® Struts®, Java® ServerFaces® or MicroSoft's ASP.NET®. IDE's often come bundled with web frameworks such as the aforementioned ones, for convenient use. Such web frameworks share the commonality of a session application interface for allowing developers to make objects persistent between web page invocations by an end user, but the IDE's are currently unaware of the usage of the session interfaces and they are treated just as any other library function.

Although it is often convenient to use such APIs, use of them to create a way to share state information between web servers can be problematic for the user because putting too many data structures into a session can virtually clog the operation of a website. For example, use of an HttpSession to maintain temporary user state information for a user's online session can present an enormous problem is, say, 1000 logged-in users each have a one-megabyte temporary storage of session information, the requirement on the system is for one gigabyte or more of memory in use to maintain the integrity of the 1000 user sessions in operation at the time. The general rule of thumb, however, is that programmers creating software for HttpSessions should store only as much state data or information as is necessary for the current business transaction and no more. Thus, when a developer writes the source code and finds it convenient to use the HttpSession API to insert an object, they need to be consistent in removing the object from the session once it is no longer needed for the business transaction. But keeping track of what is put into the session and what is taken out is difficult to do at the time the code is being created or developed by the programmer. The available solutions all provide for inspection and removal of unnecessarily saved data only later when a debugger after the application under development has been compiled.

The present invention solves this problem by providing a static monitoring and analysis tool enhancement to the IDE system which collects information from the source code the user-programmer is building. This information is used to help the user-programmer detect conditions where objects may inadvertently have been left in session. This analysis occurs at development time instead of after the application is actually deployed.

SUMMARY OF THE INVENTION

The present invention provides a method and system for providing feedback via an alert which may be displayed to the user during the development phase of creating the source code by continuously monitoring for any get ( ), set ( ), or remove ( ) operations in the session under development and which can show the entry and exit points for any such object put into the session.

This invention utilizes the website navigation class diagram form of display. This navigational view or "state diagram" form of view is employed in a preferred embodiment of the invention and may be constructed by polling the filesystem content using the method of FIG. 5, and as functionally illustrated in FIG. 4 via link 4 between the filesystem and the state diagram plug in tool 200 which is described with reference to FIG. 5. Such navigational views are commonly provided by IDE systems such as IBM's Rational Application Developer V.6.0 and can be arranged to display the overall website navigational view such as the example shown in FIG. 3 by using the process as depicted in FIG. 5.

This enables developers to resolve session problems during the actual development time, does not require laborious manual searching of the code for such conditions, nor does it require the frequent and seemingly unending task of inspecting debugger outputs after the application has been developed and deployed.

Particularly, the present invention modifies the usual IDE by providing a monitoring tool that continuously monitors for insertion, call or deletion of objects from a session and which provides a display of such information to the developer via a special enhanced session view of any code that is open for development. The new IDE shows any get object, set object or remove object operations in the session and shows the entry and exit points for each such object, allowing for alerting the user whenever object inserted or called remain in the session and are not removed, thus preventing the data buildup problem explained earlier.

BRIEF DESCRIPTION OF THE DRAWINGS

The foregoing and other objects and advantages of the invention will be appreciated more fully from the following further description thereof with reference to the accompanying drawings, wherein:

FIG. 2 is a depiction of an IDE system display that uses the result of the operation of the invention illustrated in FIG. 1 to alert the user that objects inserted into the session have not been removed.

DETAILED DESCRIPTION OF ILLUSTRATIVE EMBODIMENT

Figure 1:
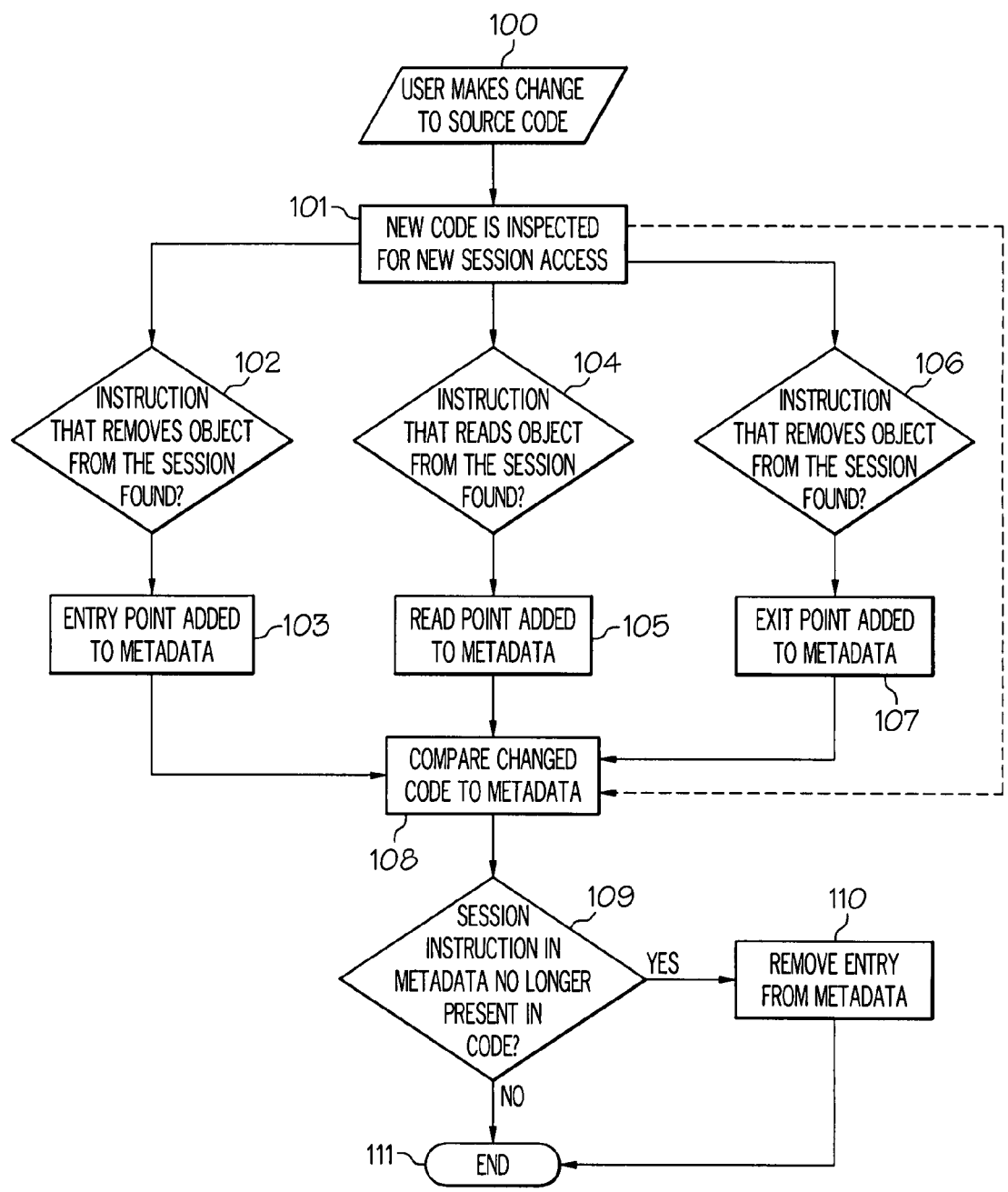
FIG. 1 illustrates schematically the block diagram of a preferred method of the invention for monitoring the source code under development for insertion, creation or removal of objects in the session under development and for alerting the user that an unremoved object still exists.

The invention will now be described in detail with reference to a preferred embodiment thereof as illustrated in the Drawings mentioned above.

The invention provides an enhanced IDE that has a session viewing feature that can be invoked by the user to provide a display of any get object, set object or remove object operations in the newly-written code for a session under development. Importantly, it shows all entry and exit points in the code for any object put into the session. This is superior to current systems as it permits developers to resolve session problems at the time of development rather than later when manual searching of code would have to be done and/or it alleviates the endless inspection of debugging outputs after the application being developed has actually been deployed for use.

Turning to FIG. 1, a schematic representation of a block diagram of a static analysis tool in a preferred embodiment of the invention is shown. This tool analyzes all newly-written code as it is being created by the user and builds a meta data file of all instructions found to either insert, call or remove an object from the session; the analysis tool then compares the changed code to the meta data file and updates the meta data if objects inserted, called or removed are no longer in the meta data file at the completion of the code writing task. The meta data file of any objects remaining in the session after completion of the writing task is then used to generate a display that informs the user of all the entry and exit points of objects inserted into the code and also displays any other sessions or instructions that have called an object into the session under development, thus enabling the user to quickly resolve any unresolved objects remaining in the session without further analysis or debugging.

In FIG. 1, the static analysis tool begins its process by monitoring for any changes made to the source code as shown in box 100. Any changed or new code is then inspected in box 102 to determine whether a new session access has begun. If a new session access has been created, the code is inspected in boxes 102, 104 and 106 to determine, respectively, whether an instruction entering an object into the session, reading an object into the session, or removing an object from the session is present. If these analyses show that any of these actions has occurred, the identification of the object entry point, read point or exit point is added to a meta data file as shown by the operation of the system in boxes 103, 105 and 107, respectively. Once the code writing task has been completed, the newly written code is compared, in box 108, to the meta data file and a further analysis is made in box 109 to determine whether any objects inserted, called or removed still remain in the code and, if they do not, the meta data file is updated to remove entries to all such objects inserted, read or removed that are no longer found in the code and the process ends. The remaining meta data file, however, will retain a record of all unremoved object entries, insertions via calls or reads, and exits and this data can be accessed and read to display the resulting information as shown in FIG. 2.

Figure 2:
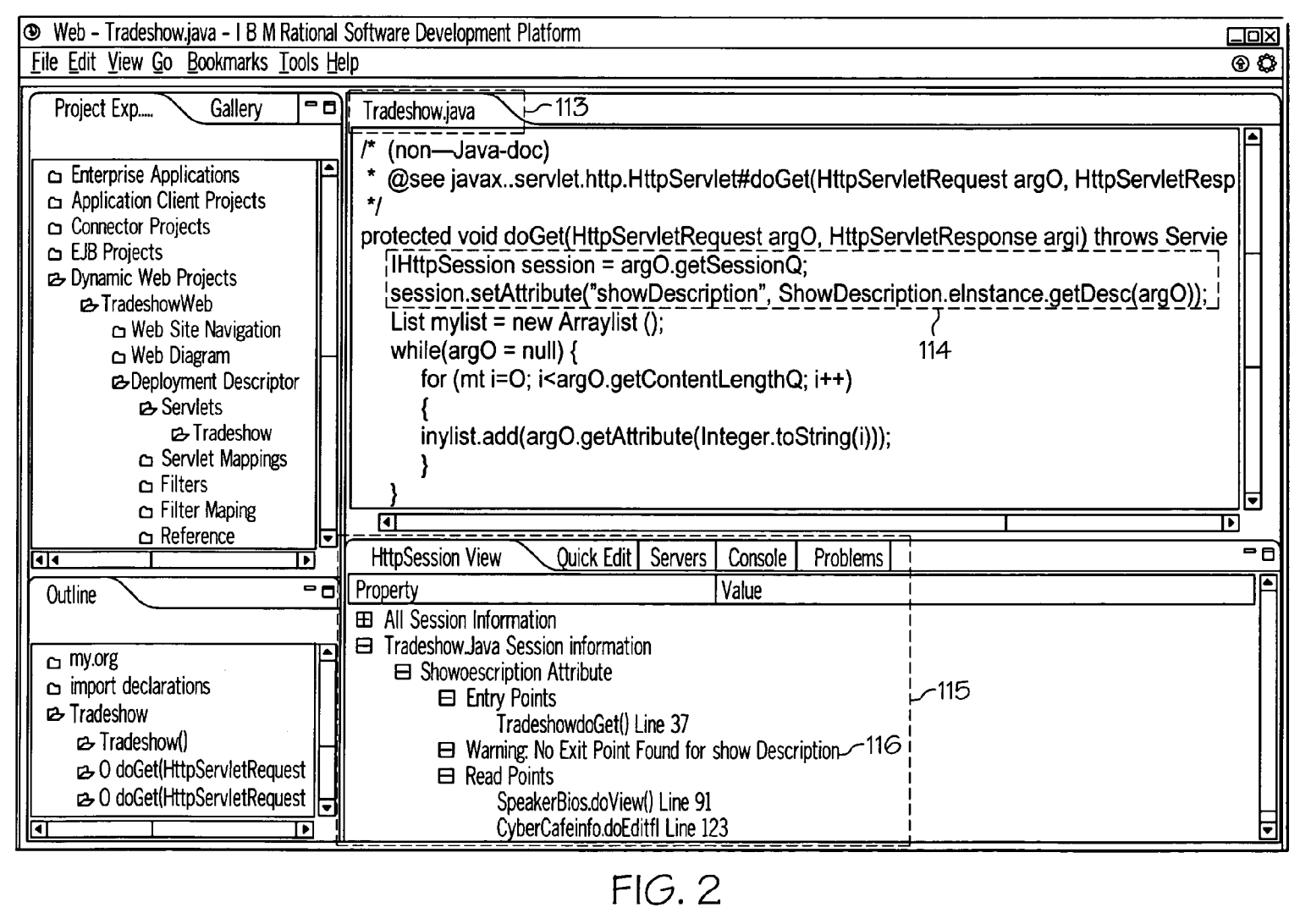

In FIG. 2, a depiction of a display 112 generated by a typical IDE system is shown and an example session view is illustrated. In this example, it is assumed that a developer has opened a Java class called "Tradeshow.java", as an example of source code for a session under development. This is illustrated in FIG. 2 by the label in box 113 "Tradeshow.Java". The identity of the HTTP session under development is shown in box 114 and the entries from the metadata file generated by the analysis tool of FIG. 1 are displayed in box 115 where the session object entries, exits and reads or calls are listed. Any unresolved objects are identified in a highlighted portion, such as the item 116 in this example display where no exit point was found for the object named "showdescription". This enables the user to quickly locate the portion of the source code under development that may need attention to resolve the object that was entered into the session.

To illustrate its operation, let us assume that the example the Java class "Tradeshow.Java" puts a string into the session called "ShowDescription" with a session .setValue ("showDescription:, myObject) call. The session view generated by the IDE system is shown in FIG. 2 and displays not only the showDescription call as an entry point in the session, but it also shows where the exit point is. For example, the application may remove showDescription from the session in SpeakerBio.java, but if there is no exit point for the session attribute, the IDE system, reading the meta data file generated by the analysis tool of FIG. 1, will highlight the showDescription object that was inserted into the session as a warning to the user that this object may need attention. The display also shows every Java class that read or used the showDescription object during the session as an aid to correcting any unresolved object issues. All this information is displayed as illustrated in FIG. 2 and as described above so that the user may easily determine what other classes in his or her codebase are manipulating the showDescription object session attribute. In this case, the analysis tool of FIG. 1 as incorporated into the IDE system could not find HttpSession.removeValue ("showDescription") anywhere in the codebase and has highlighted it in the box 115, line 116 as shown.

Figure 5:
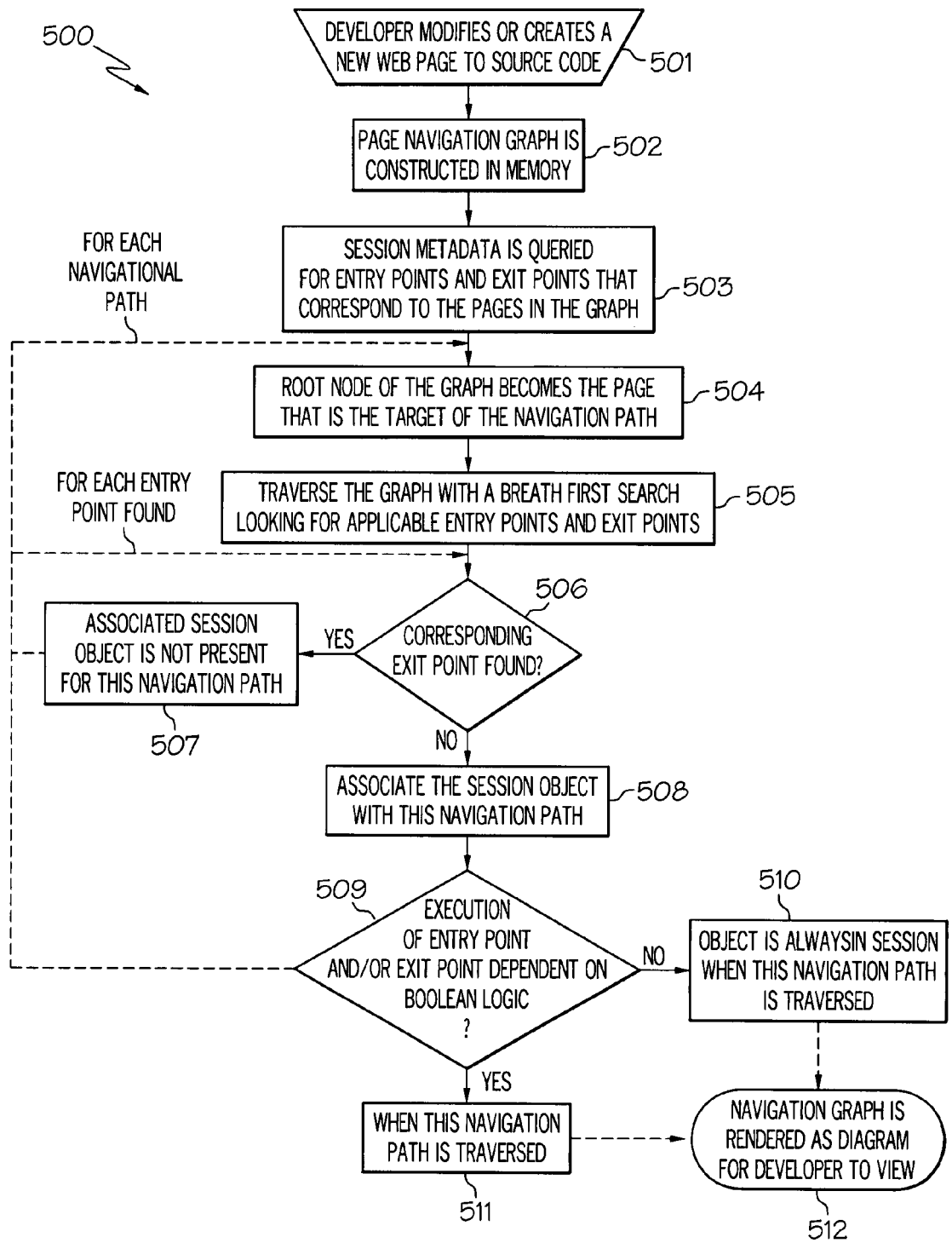
FIG. 5 illustrates schematically the block diagram of a preferred method of the invention for creating the navigational view display as shown in FIG. 3.

The analysis tool of FIG. 1 and the session information viewer of FIG. 2 and, indeed, the navigational viewer of FIG. 5 may all be implemented as plug-ins because of the Eclipse product's modular architecture. If the IDE is based on the Eclipse® system, the plug in code may be given the standard preference properties to enable session viewing for a variety of technologies such as Servlets, Java ServerFaces, and JSR 168 Portlets.

However, for simplicity, the rest of this example assumes only that the Servlet session viewing is enabled. Utilizing the process of the tool in FIG. 1, the plug in code creates a lookup table indexed by session attribute by inspecting every class on the classpath for the current project under development. The lookup table would then be populated with a JavaBean class that includes the three lists of the tool in FIG. 1: the entry point list which, in this example, would add HttpSession.setValue object it adds it to the list. The exit point list, when the plug in finds HttpSession.removeValue object, it is added to a second list, and a Read Point List when the plug in finds HttpSession.getValue object it is added to the third list. Thus, whenever a class is opened, the plug in, using the process of FIG. 1, scans the class for any access to the session API and uses the session attribute lookup table to get the entry, exit and read points.

Figure 4:
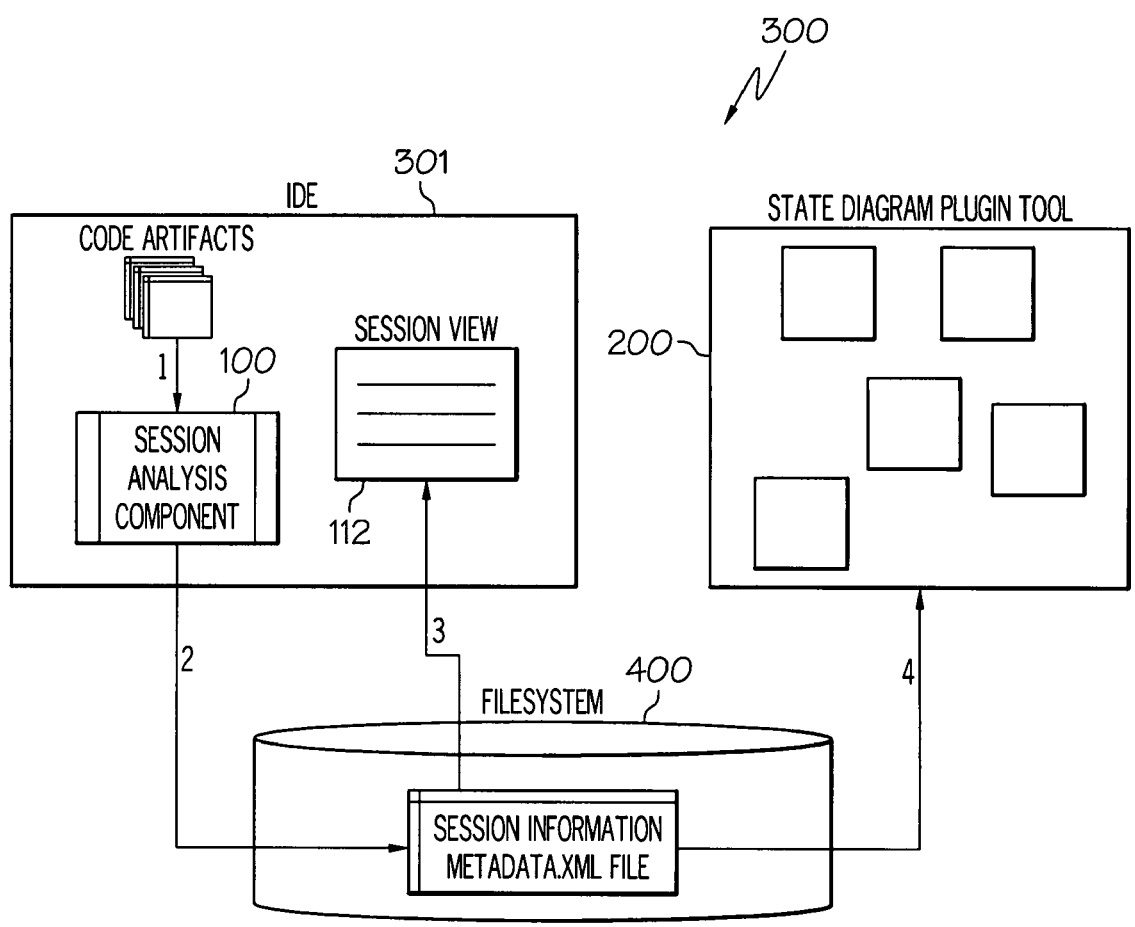
FIG. 4 is an overall functional view of the invention as integrated in a typical IDE system and also illustrates how the components of the system interact to provide either the session view as shown in FIG. 2 or the navigational view as shown in FIG. 3.

To further illustrate this process and it's interrelationship to the IDE system and its components as well as to the alternative method of viewing the information in a navigational view, FIG. 4 shows the overall system 300 in which the IDE 301 is provided with a plug-in session analysis component 100 as depicted in FIG. 1 and with a Session viewer component 112 as depicted in FIG. 2. A File system 400 contains the session information in metadata.xml files and will contain the lists referred to above as a result of the operation of the invention's static analysis tool, 100.

In operation, the analysis process 100 of FIG. 1 and as depicted by box 100 in FIG. 4, continually inspects code 1 for session information which it stores 2 in the filesystem 400. The session view component of FIG. 2 polls the filesystem 400 via link 3 in FIG. 4 to gather the information therein to construct the screen display showing the latest entry, exit and read points in the code under construction.

As an alternative to the display method used by the IDE system as shown in FIG. 2, a second preferred embodiment is also given for this invention which utilizes the website navigation class diagram form of display. This navigational view or "state diagram" form of view is a second preferred embodiment of the invention and may be constructed by polling the filesystem content using the method of FIG. 5 and as functionally illustrated in FIG. 4 via link 4 between the filesystem and the state diagram plug in tool 200 which is described with reference to FIG. 5. Such navigational views are commonly provided by IDE systems such as IBM's Rational Application Developer® and can be arranged to display the overall website navigational view such as the example shown in FIG. 3 by using the process as depicted in FIG. 5.

Figure 3:
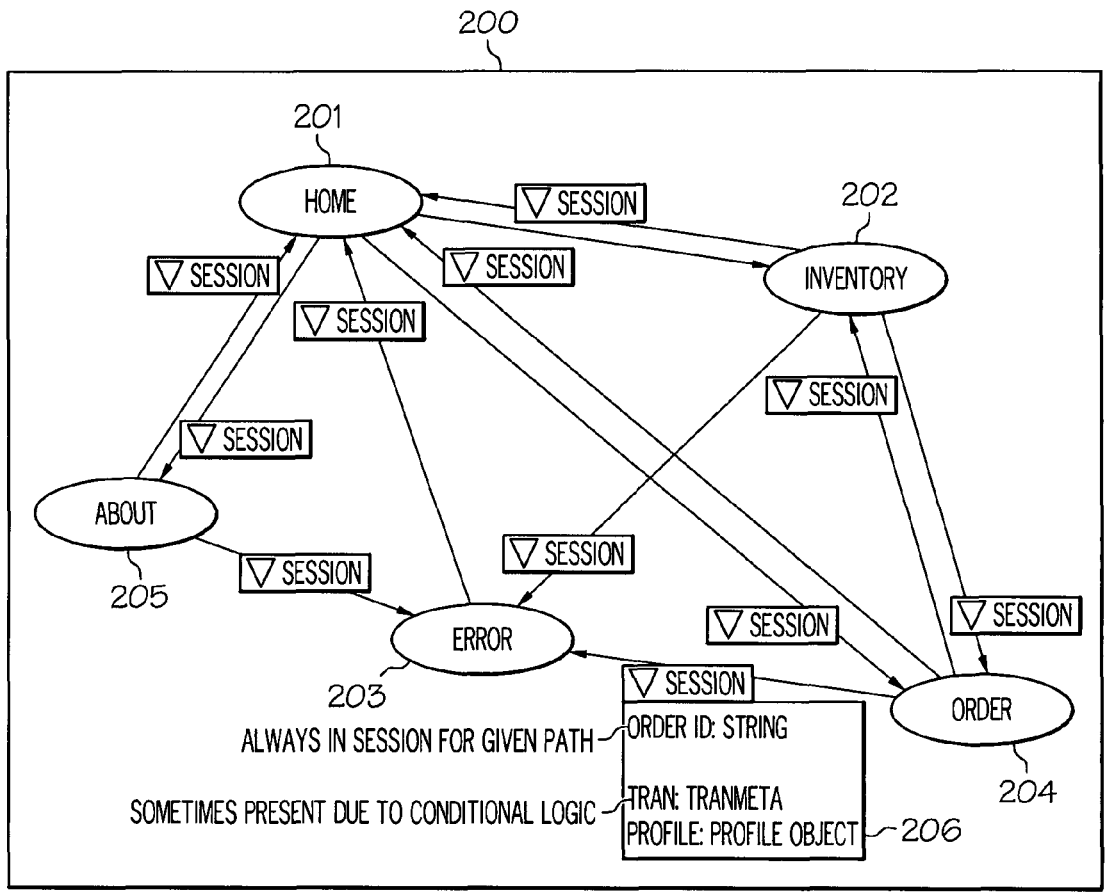
FIG. 3 is a navigational block diagram of an alternative embodiment of an IDE's display system that uses the result of the operation of the invention as illustrated in FIG. 1.

In FIG. 3, a typical website navigational diagram 200 is illustrated. In the diagram 200, various webpages such as "home" 201, "inventory" 202, "error" 203, "order" 204 and "about" 205 are shown. Tools of this type are used to graphically illustrate for the developer how the various sessions created in moving from one webpage to another relate to one another. These sessions are shown by the interconnecting lines labeled "session" in FIG. 3. The system of the invention may be used to greatly enhance the view by accessing the metadata file generated by the process of FIG. 1 and displaying the results in a drop-down box associated with the particular session under analysis as shown in box 206 of FIG. 3. The code content can be inspected for every webpage navigation path, thus quickly enabling the user to identify any unresolved object problems that can impede scaling and take corrective action. The webpages could be JavaServer Pages, for example, and there are some cases when objects may be inserted into the session based upon conditional logic or inserted and not removed directly as with any code. This will be detected by the analysis tool of FIG. 1, added to the metadata file, and used to create the display as shown in box 206. In this example, the results stored in the metadata file are displayed on the session path on the navigational diagram generated by the IDE which quickly identifies any potential problems with that session. It enables a user to very quickly run an analysis of each session's path on the website and uncover any unresolved object issues that would inhibit proper scaling of the application.

The process by which the invention constructs the "state diagram" or navigational view as shown in FIG. 3 is illustrated schematically in FIG. 5 in which the overall state diagram rendering plug in code process is shown.

In FIG. 5, the navigational view process 500 begins with block 501 where the code checks constantly for any new developer-created web page or modifies an existing web page in his code under development and proceeds, in box 502, to construct a page navigational graph in memory. The process then queries in box 503 the session metadata in the filesystem for any entry and/or exit points that correspond to the pages in the navigational graph in memory. The root node of the graph in memory becomes the page that is the target of the navigation path as shown in block 504. This portion of the graph data is searched for applicable entry points in block 505 and a check is then made in block 506 to determine whether a corresponding exit point is found for the entry point identified in block 505. If a corresponding exit point is found to exist, the block 507 finds that the session object is no longer present for this portion of the navigation path and exits back, as shown by the dotted line, to check for entry points for each navigation path in the graph in memory.

However, if no corresponding exit point is found in block 506, the process continues in block 508 to associate this session object entry with the current navigation path under analysis and then checks, in block 509, as to whether the execution of the entry point and/or exit point is dependent on Boolean logic. If the answer to this inquiry is "yes", the object may be in the session when this portion of the navigational path is traversed as indicated in block 511, which will trigger the rendering of the graphical information onto a display along with the associated entry or exit or read point information so the developer can view the navigation path on which the entry point still remains. However, if the entry point is not dependent on Boolean logic in block 509, the process continues in block 510 to find that the object is always in the session whenever this navigation path is traversed, which also triggers the rendering of the graphical information from memory along with the associated navigational path for the developer to view as shown in FIG. 3.

Having thus described the invention with reference to a preferred embodiment thereof, it will be apparent to those of skill in this art that the invention would be implemented in any particular IDE system with ease, wherefore the invention as described in the following claims is not limited to any particular IDE system or to any particular programming language or technique.

What is claimed is:

1. An enhanced interactive development environment (IDE) computer hardware system for identifying inserted and unremoved objects, for a user session, within source code, comprising:
   a storage device having stored therein a meta data file; and
   a processor, wherein the processor is configured to perform:
   inspecting newly written source code for the user session to identify any interactions by the code, with the user session, where object entry, object exit, or object read points occur,
   storing, within the meta data file, the identified points,
   comparing content of the newly written source code with said meta data file,
   removing a point from said meta data file upon the comparing finding that an object referenced by said point has been removed from said user session,
   displaying the identity of remaining points in said meta data file on a navigational diagram that illustrates where said remaining points occur within the session, and
   displaying said object entry, object exit, or object read points in said session in association with an identity of a particular instruction which caused a creation of said object entry, object exit, or object read point.

2. The enhanced IDE computer hardware system of claim 1, wherein the processor is further configured to perform:

an identity of any instruction creating one of the remaining points in said meta data file.

3. A method for identifying inserted and unremoved objects, for a user session, within source code, comprising:

inspecting said code for a new session access instruction, within the code, that either enters, reads, or removes an object from said user session;

storing an object entry, object exit, or object read point of said new session access instruction in a meta data file;

comparing content of said meta data file with content of said code;

identifying an object referenced by an object entry, object exit, or object read point remaining within said meta data file;

displaying object entry, object exit, or object read points remaining within said meta data file on a navigational diagram that illustrates where said remaining points occurs within the session; and removing from said meta data file a stored object entry, object exit, or object read point of an object found during the comparing as being not within said user session at the time of the comparing.

4. The method of claim 3, further comprising:
displaying an identity of any session interaction instruction creating one of the remaining points in said meta data file.

5. The method of claim 3, further comprising:
highlighting the remaining points.

* * * * *